United States Patent [19]

Tanaka et al.

[11] 4,215,541
[45] Aug. 5, 1980

[54] DUAL-CATALYST EXHAUST GAS PURIFYING APPARATUS FOR MULTI-CYLINDER ENGINE

[75] Inventors: Kazuyuki Tanaka; Kazuo Kobayashi; Tatsuro Oda; Tadataka Nakazumi, all of Hiroshima, Japan

[73] Assignee: Toyo Kogyo Co., Ltd., Hiroshima, Japan

[21] Appl. No.: 922,429

[22] Filed: Jul. 6, 1978

[30] Foreign Application Priority Data

Jul. 6, 1977 [JP] Japan .................................. 52-81287
Jul. 15, 1977 [JP] Japan .................................. 52-94614[U]

[51] Int. Cl.² .................................................... F01N 3/15
[52] U.S. Cl. ........................................ 60/284; 60/293; 60/289; 60/301
[58] Field of Search .................... 60/284, 293, 289, 301

[56] References Cited

U.S. PATENT DOCUMENTS

| | | | |
|---|---|---|---|
| 3,767,764 | 10/1973 | Dolbear | 60/301 |
| 3,791,144 | 2/1974 | Lang | 60/301 |
| 3,984,975 | 10/1976 | Price | 60/284 |
| 4,077,209 | 3/1978 | Suzuki | 60/289 |

*Primary Examiner*—Douglas Hart
*Attorney, Agent, or Firm*—Wenderoth, Lind & Ponack

[57] ABSTRACT

For use in an automobile multi-cylinder engine having exhaust ports leading from engine cylinders and through which exhaust gases are emitted, an exhaust gas purifying apparatus comprising a reducing catalyst unit and an oxidizing catalyst unit disposed in a main exhaust manifold communicated through exhaust ducts to a first group of the exhaust ports and, on the other hand, to the atmosphere, an auxiliary exhaust manifold communicated to a second group of the exhaust port and, on the other hand, to a portion of the main exhaust manifold at a position intermediately between the reducing and oxidizing catalyst units, a secondary air supply passage extending from a source of secondary air to the auxiliary exhaust manifold, and an additional secondary air supply passage extending from the secondary air source to any one of the collecting ducts communicated to the exhaust ports of the first group. The apparatus further comprises means for warming the exhaust gases emitted from the exhaust port of the second group.

8 Claims, 4 Drawing Figures

DUAL-CATALYST EXHAUST GAS PURIFYING APPARATUS FOR MULTI-CYLINDER ENGINE

BACKGROUND OF THE INVENTION

The present invention generally realtes to an exhaust gas purifying apparatus and, more particularly, to a dual-catalyst exhaust gas purifying apparatus for an automotive vehicle engine of a type having a plurality of engine cylinders.

The U.S. Pat. No. 3,908,371, patented on Sept. 30, 1975, discloses an exhaust gas purifying apparatus for an automotive vehicle, which utilizes a dual-catalyst exhaust treatment system including a reducing catalyst for removing an excess of oxygen and reducing nitrogen oxides in the exhaust gases and an oxidizing catalyst for oxidizing carbon monoxide and hydrocarbons in the exhaust gases. More specifically, according to the above mentioned United States patent, a plurality of exhaust ducts respectively leading from exhaust outlets of the corresponding engine cylinders are merged into a single exhaust manifold having reducing and oxidizing catalyst units disposed thereon so that the exhaust gases emitted from the engine cylinders subsequent to combustion of an air-fuel mixture within such engine cylinders can, after having been joined together, pass through the reducing catalyst unit and then through the oxidizing catalyst unit prior to such exhaust gases being discharged to the atmosphere. In order to enhance oxidization of carbon monoxide and hydrocarbons in the exhaust gases which have passed through the reducing catalyst unit, the purifying apparatus of the above mentioned United States patent further comprises a secondary air supply means including an engine operated pump for introducing a secondary air into a portion of the exhaust manifold between the reducing catalyst unit and the oxidizing catalyst unit.

In the prior art dual-catalyst purifying apparatus of a construction described above, the engine operated pump for introducing the secondary air into the manifold portion between the reducing and oxidizing catalyst units is essentially necessitated. The reason for this is obviously rooted in that all of the exhaust ducts respectively leading from the individual engine cylinders are bundled into the single exhaust manifold at a position upstream of the reducing catalyst unit in terms of the direction of flow of the exhaust gases towards the atmosphere. More specifically, as is well known to those skilled in the art, automobile exhaust gases successively emitted from the engine cylinders generally flow through an exhaust manifold towards the atmosphere in a substantially pulsating manner with the pressure inside the exhaust manifold alternately increasing and decreasing because of different timing of firing of air-fuel mixtures within the respective engine cylinders.

While so is well known to those skilled in the art, if all of the exhaust gases successively emitted from the individual engine cylinders are allowed to pass through the reducing catalyst unit such as in the prior art dual-catalyst purifying apparatus, the pulsating characteristic of flow of the exhaust gases through the exhaust manifold downstream of the reducing catalyst unit is so weakened that the prior art dual-catalyst purifying apparatus cannot make use of such pulsating characteristic in supplying the secondary air into the exhaust manifold portion downstream of the reducing catalyst unit and upstream of the oxidizing catalyst unit, and an external pumping means, such as the engine operated pump, is necessitated accordingly.

The employment of the engine operated pump substantially results in increase of the cost of manufacture of the purifying apparatus which in turn reflects upon the cost of manufacture of an automotive vehicle equipped with such purifying apparatus. In addition, since the engine operated pump utilizes a drive from a power output shaft of the engine, the power output shaft is unnecessarily loaded which substantially constitutes one of causes of reduction in power output of the engine as a whole.

The copending U.S. patent application Ser. No. 891,111, filed on Mar. 28, 1978, in which two of the inventors of the present invention are involved and which is assigned to the same assignee of the present invention, discloses a dual-catalyst purifying apparatus which substantially eliminates the disadvantages and inconveniences inherent in the above described prior art purifying apparatus. According to this copending U.S. patent application, a plurality of exhaust ports respectively leading outwards from engine cylinders are divided into first and second groups, the exhaust ports of the first group being communicated to a main exhaust manifold having reducing and oxidizing catalyst units disposed therein while the exhaust ports of the second group are communicated to a portion of the main exhaust manifold between the reducing and oxidizing catalyst units through an auxiliary exhaust manifold.

For supplying a secondary air necessary to enhance oxidization of the exhaust gases during the passage of the exhaust gases through the oxidizing catalyst unit, a portion of the auxiliary exhaust manifold is communicated to a source of secondary air through a pressure operated valve which is employed in the form of a reed valve.

The dual-catalyst purifying apparatus disclosed in the copending U.S. patent application is so designed that, since there is no substantial resistance to flow of the exhaust gases in the auxiliary exhaust manifold, the exhaust gases which are successively emitted from the exhaust ports of the second group at intervals determined by the timing of successive firing of the air-fuel mixture within the respective engine cylinders flow through the auxiliary exhaust manifold in a pulsating manner with the pressure alternately increasing and decreasing and this pulsating flow of the exhaust gases through the auxiliary exhaust manifold can be utilized to repeatedly open and close the reed valve.

The dual-catalyst purifying apparatus disclosed in the copending U.S. patent application is operable satisfactorily. However, it has been found that, during a particular operating condition of the engine, the purifying capability of the apparatus as a whole is more or less lowered as compared with that during other operating conditions of the same engine. This is particularly true when the engine starts its operation while it is cool, specifically, when the oxidizing catalyst unit is correspondingly cool and of a temperature lower than the operating temperature at which the oxidizing catalyst exhibits its performance.

In particular, when the engine starts its operation while it is cool, for example, during the cold start of the engine, an enriched air-fuel mixture is generally supplied into the engine cylinders to facilitate a quick start of operation of the engine and also to facilitate acceleration of the vehicle, the consequence of which is that exhaust gases containing a relatively great amount of noxious unburned components such as carbon monoxide and hydrocarbons are emitted from the engine cylinders. On the other hand, it is quitely natural that, when the engine is cool, the oxidizing catalyst unit is correspondingly cool.

Therefore, with the dual-catalyst purifying apparatus disclosed in the copending U.S. patent application, unless the oxidizing catalyst is heated to the operating temperature usually within the range of 250° to 400° C. depending upon the type thereof, the oxidizing catalyst unit would not satisfactorily serve the purpose, not completely though it may be. Moreover, the supply of the secondary air towards the oxidizing catalyst unit through the auxiliary exhaust manifold together with the exhaust gases emitted from the second group of the exhaust ports of the engine results in a prolonged period of time required for the oxidizing catalyst to be heated to the operating temperature since the secondary air introduced is substantially of an atmospheric temperature.

SUMMARY OF THE INVENTION

Accordingly, the present invention has been developed in view to substantially eliminating the disadvantages and inconveniences inherent in the dual-catalyst exhaust gas purifying apparatuses of the respective constructions described above and is intended to provide an improved dual-catalyst purifying apparatus for an automotive vehicle engine of a type having a plurality of engine cylinders, wherein the exhaust gases emitted from one of two groups of exhaust ports of the respective engine cylinders, which are to be passed through the reducing catalyst unit and then through the oxidizing catalyst unit, are heated to facilitate an eventual warmup of the oxidizing catalyst unit by the utilization of the elevated temperature of such exhaust gases only during a period in which the temperature of the oxidizing catalyst unit is lower than the operating temperature.

Another important object of the present invention is to provide an improved dual-catalyst purifying apparatus of the type referred to above, which is simple in construction and does not require a complicated piping system and which does not utilize a drive from the engine power output shaft.

For the purpose of accomplishing these and other objects of the present invention, the concept of the present invention is applied to an automotive vehicle engine of a type having a plurality of engine cylinders which have respective intake port means communicated on one hand to an intake manifold means including a source of air-fuel mixture and to associated combustion chambers within the engine cylinders on the other hand, and which also have exhaust port means, the exhaust port means of the first group being communicated to a main exhaust manifold means leading to the atmosphere while the exhaust port means of the second group being communicated to an auxiliary exhaust manifold means also leading to the atmosphere.

In this multi-cylinder engine, according to the present invention, reducing and oxidizing catalyst units are installed in the main exhaust manifold means at upstream and downstream sides with respect to the direction of flow of the exhaust gases from the exhaust port means of the first group towards the atmosphere and one end of the auxiliary exhaust manifold means remote from the exhaust port means of the second group is communicated to the main exhaust manifold means at a position substantially intermediate between the reducing and oxidizing catalyst units. In this arrangement, in order to render the whole amount of the exhaust gases, emitted from the exhaust port means of the first and second groups and ready to pass through the oxidizing catalyst unit, to have a nature readily oxidizable as they subsequent pass through the oxidizing catalyst unit, a secondary air is supplied into the auxiliary exhaust manifold means by the utilization of the pulsating flow of the exhaust gases flowing through the auxiliary exhaust manifold means.

As one of essential features of the present invention, the secondary air is also supplied into a portion of the main exhaust manifold means, which is upstream of the reducing catalyst unit, thereby to render the exhaust gases, emitted from the exhaust port means of the first group and ready to pass through the reducing catalyst unit, to have a nature readily oxidizable so that, as such exhaust gases from the exhaust port means of the first group subsequently pass through the reducing catalyst unit together with the secondary air so supplied into the main exhaust manifold means, the temperature of such exhaust gases from the exhaust port means of the first group can be elevated. This is possible because the reducing catalyst unit is utilized in the oxidizing atmosphere. However, the supply of the secondary air into the main exhaust manifold means is effected only during a predetermined period of time, in particular, during a period of time in which the temperature of the oxidizing catalyst unit is lower than the operating temperature at which the oxidizing catalyst exhibits its performance, i.e., the oxidizing capability.

The supply of the secondary air into the main exhaust manifold means described above is also effected by the utilization of the pulsating flow of the exhaust gases.

With the dual-catalyst purifying apparatus embodying the present invention, so long as the temperature of the oxidizing catalyst unit is lower than the operating temperature and, hence, so long as the exhaust gas emitted from the exhaust port means of the first group are mixed with the secondary air so that such exhaust gases can have a readily oxidizable nature prior to being passed through the reducing catalyst unit, the reducing catalyst is used in the oxidizing atmosphere for the purpose of elevating the temperature of the exhaust gases emerging from the reducing catalyst unit. Accordingly, by the utilization of the temperature of the exhaust gases from the exhaust port means of the first group which have been elevated in the manner as hereinbefore described, the oxidizing catalyst unit can be warmed up as they pass therethrough.

In another embodiment of the present invention, the dual-catalyst purifying apparatus is provided with means for warming the exhaust gases emitted from the exhaust port means of the second group. The employment of this warming means is not essential, but is preferred in view of the fact that the supply of the secondary air into the auxiliary exhaust manifold means may result in reduction of the temperature which may in turn reduce the temperature of the exhaust gases ready to pass through the oxidizing catalyst unit. This is particularly true where the secondary air is constituted by an atmospheric or ambient air and is considerably cool during the winder season or in a cold climate land.

In view of the above, the dual-catalyst purifying apparatus embodying the present invention can exhibit its optimum performance throughout all of the operating conditions of the automotive vehicle engine.

It is generally understood that, in order to render the reducing catalyst to exhibit its performance, automobile exhaust gases to be reacted in the presence of the reducing catalyst should be of a nature readily reduced in the presence of such reducing catalyst while, in order to render the oxidizing catalyst to exhibit its performance, the same should be of a nature readily oxidizable in the presence of oxygen. In view of this, in the dual-catalyst purifying apparatus embodying the present invention, arrangement may be made such that an air-fuel mixture to be introduced into some of the engine cylinders, which are communicated to the exhaust port means of the first group, can be proportioned to an air-to-fuel mixture ratio substantially equal to or appreciably richer than a stoichiometric air-to-fuel mixture ratio, so that the exhaust gases subsequently emerging from the exhaust port means of the first group into the main exhaust manifold means has a tendency to be readily reduced as they pass through the reducing catalyst unit. This can be achieved by the use of, for example, at least two carburetors through which the air-fuel mixture, proportioned to a ratio substantially equal to or appreciably richer than the stoichiometric air-to-fuel mixture ratio, and the air-fuel mixture of a ratio different from that of the first mentioned air-fuel mixture can be respectively introduced into some of the engine cylinders, communicated to the exhaust port means of the first group, and the other of the same engine cylinders communicated to the exhaust port means of the second group. So far as the exhaust gases emerging from the exhaust port means of the second group are concerned, they may have a tendency either ready to be reduced in the presence of the reducing catalyst or ready to be oxidized in the presence of the oxidizing catalyst. Even though the exhaust gases emerging from the exhaust port means of the second group has a tendency ready to be reduced in the presence of the reducing catalyst, that is, similar in nature to that of the exhaust gases emerging from the exhaust port means of the first group, such as in the case where a single carburetor is employed and the air-fuel mixture of a ratio substantially equal to or appreciably richer than the stoichiometric air-to-fuel mixture ratio is equally introduced into all of the engine cylinders, no substantial reduction in overall purification of the exhaust gases takes place because the secondary air is so introduced in the manner as hereinbefore described that a mixture of the exhaust gases passed through the reducing catalyst unit and those supplied through the auxiliary exhaust manifold means can be modified to have a tendency ready to be oxidized as it subsequently passes through the oxidizing catalyst. However, so long as the secondary air is introduced into the main exhaust manifold means in the manner as hereinbefore described during the particular period of time, the exhaust gases emerging from the exhaust port means of the first group is forced to have a tendency to be readily oxidized, even though they are passed through the reducing catalyst unit prior to their passage through the oxidizing catalyst unit.

BRIEF DESCRIPTION OF THE DRAWING

These and other objects and features of the present invention will become apparent from the following description taken in conjunction with preferred embodiments thereof with reference to the accompanying drawings, in which.

DETAILED DESCRIPTION OF THE INVENTION

Figure 1:
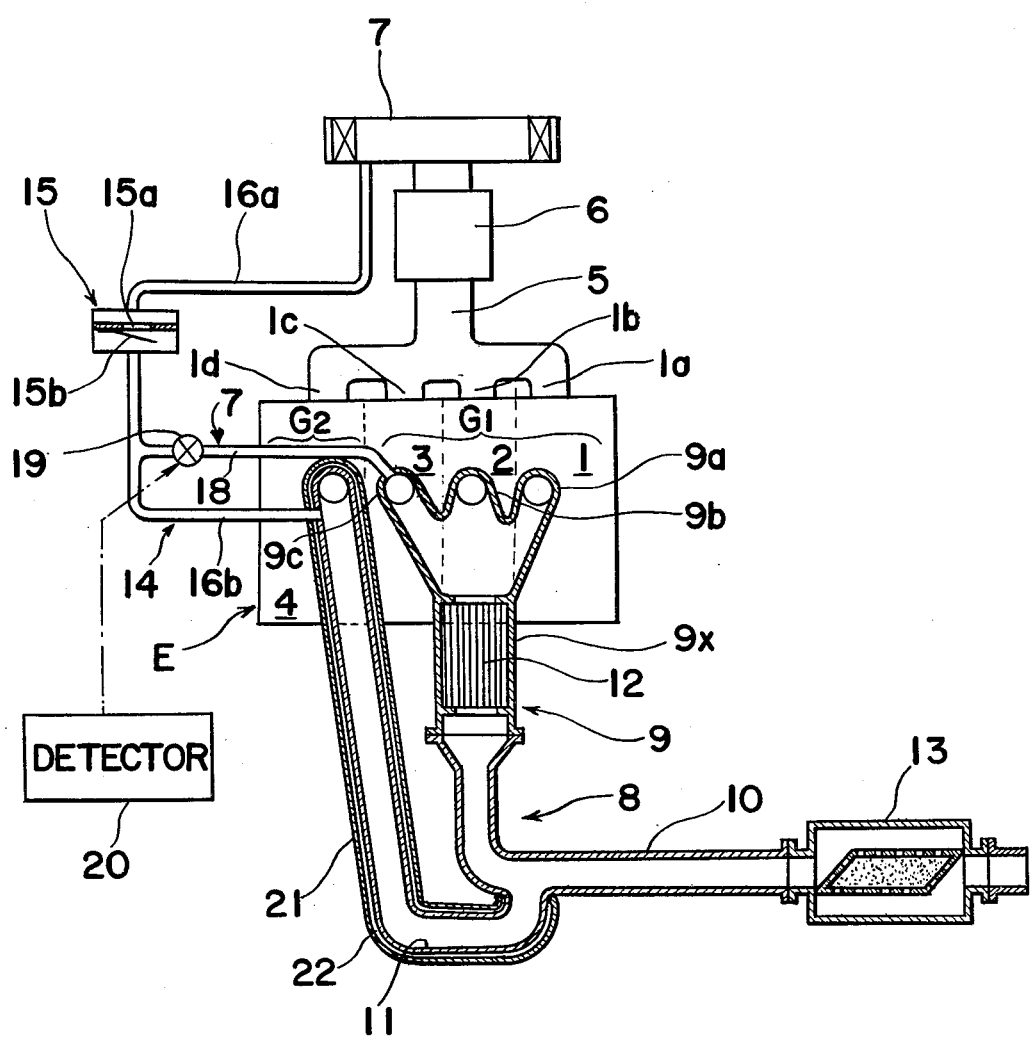
FIG. 1 is a schematic side sectional view of a four-cylinder engine equipped with a dual-catalyst exhaust gas purifying apparatus according to a preferred embodiment of the present invention.

Before the description of the present invention proceeds, it is to be noted that like parts are designated by like reference numerals throughout the accompanying drawings.

Referring first to FIG. 1, there is shown an automobile internal combustion engine E of any known construction having four engine cylinders 1, 2, 3 and 4 having respective intake ports (not shown) communicated through intake ducts 1a, 1b, 1c and 1d to an intake manifold 5. The intake manifold 5 includes a carburetor 6 disposed thereon, said carburetor 6 serving as a source of air-fuel mixture where a fresh air and a fuel respectively supplied from the atmosphere through an air cleaner 7 and a fuel tank (not shown) are mixed in a predetermined mixture ratio substantially equal to or appreciably richer than the stoichiometric air-to-fuel mixture ratio in any known manner.

The engine cylinders 1, 2, 3 and 4 also have respective exhaust ports which, for the purpose of description of the present invention, are divided into two groups G1 and G2. The number of the exhaust ports of the first group should be equal to or greater than half the total number of the engine cylinder, but in the instance as shown, the first group G1 is constituted by three exhaust ports of the engine cylinders 1, 2 and 3 while the second group G2 is constituted by the only exhaust port of the engine cylinder 4.

The exhaust ports of the first group G1 are connected to a main exhaust manifold means 8 including a collecting duct means 9 and an exhaust passage 10, the collecting duct means 9 being constituted by a tubular body 9x and exhaust ducts, 9a, 9b and 9c outwardly branched off from one end of the tubular body 9x and coupled respectively to the exhaust ports of the first group G1. The exhaust port of the second group G2 is communicated to the exhaust passage 10 through an auxiliary exhaust manifold means 11.

So far illustrated, the air-fuel mixture proportioned to a mixture ratio appreciably richer than the stoichiometric air-to-fuel mixture ratio is equally supplied into the individual engine cylinders 1, 2, 3 and 4 and, therefore, portions of exhaust gases subsequently exhausted from the respective engine cylinders 1 to 4 are similar in quality or nature to each other. This is particularly advantageous in that the engine intake system can be simplified requiring the only carburetor 6 as shown. However, it is preferred that only the air-fuel mixture to be introduced into the engine cylinders 1, 2 and 3 associated with the exhaust ports of the first group G1 be proportioned to such a mixture ratio that the exhaust gases subsequently emerging from the respective engine cylinders 1, 2 and 3 are of a nature ready to be reduced in the presence of a reducing catalyst while the air-fuel mixture to be introduced into the engine cylinder 4 associated with the exhaust port of the second group G2 may be of a mixture ratio equal to or different from that of the air-fuel mixture to be supplied into the engine cylinders 1 to 3, although this requires the use of two carburetors in the intake system.

Within the tubular body 9x of the collecting duct means 9, there is installed a reducing catalyst unit 12 containing any one of a known three-way catalyst and a catalyst of a type capable of exhibiting a reducing function, when used in the reducing atmosphere, and also an oxidizing function when used in the oxidizing atmosphere. The catalyst employed in the catalyst unit 12 may be either a pellet type or a monolithic type so far as the embodiment of FIG. 1 is involved. It is to be noted that the catalyst unit 12 is so installed within the tubular body 9x that the entire amount of the exhaust gases emitted from the exhaust ports of the first group G1 can flow therethrough towards the exhaust passage 10.

The exhaust manifold means 10 includes, in addition to the reducing catalyst unit 12, an oxidizing catalyst unit 13 which may contain any one of an oxidizing catalyst, a three-way catalyst and a catalyst of a type capable of exhibiting a reducing function, when used in the reducing atmosphere, and also an oxidizing function when used in the oxidizing atmosphere. Even the catalyst employed in the catalyst unit 13 may be either a pellet type or a monolithic type. This catalyst unit 13 is installed in the exhaust passage 10.

While the exhaust manifold means 8 has the catalyst units 12 and 13 so installed as hereinbefore described, one end of the auxiliary exhaust manifold means 11 remote from the exhaust port of the second group G2 is communicated to the exhaust passage 10 at a position substantially intermediate between the catalyst units 12 and 13.

The dual-catalyst purifying apparatus embodying the present invention further comprises a secondary air supply passage means 14 including a pressure operated valve 15, which is employed in the form of a reed valve, an upstream supply passage 16a extending between a source of secondary air, for example, the air cleaner 7, and the reed valve 15, and a downstream supply passage 16b having one end in communication with the reed valve 15 and the other end communicated to the auxiliary exhaust duct means 11. The reed valve 15 is of a type having an aperture 15a and a reed member 15b adapted to open and close the aperture 15a and is so disposed as to operate in such a manner that, when a negative pressure and a positive pressure are alternately developed in the auxiliary exhaust manifold means 11 during the pulsating flow of the exhaust gases therethrough, the reed member 15b is correspondingly alternately displaced to open and close the aperture 15a to allow and interrupt, respectively, the supply of the secondary air from the passage 16a onto the passage 16b. It is to be noted that, during the condition in which the reed member 15b is held in position to close the aperture 15a because of the positive pressure present within the auxiliary exhaust manifold means 11, no exhaust gases flow from the passage 16b into the passage 16a and, in other words, the reed valve serves as a sort of check valve.

In the construction so far described, it is clear that the exhaust gases exhausted from the engine cylinders 1, 2 and 3 are collected together as they enter the collecting duct means 9 and then flows towards the atmosphere through the reducing catalyst unit 12 within the tubular body 9x and then through the oxidizing catalyst unit 12 in the exhaust passage 10. As hereinbefore described, as the exhaust gases flow through the reducing catalyst unit 12, nitrogen oxides contained in the exhaust gases are reduced and, as the exhaust gases are subsequently passed through the oxidizing catalyst unit 13, carbon monoxides and hydrocarbons still contained in the exhaust gases are oxidized. On the other hand, since there is no resistance to the flow of the exhaust gases exhausted from the engine cylinder 4 into the auxiliary exhaust manifold means 11, the secondary air can be sucked into the exhaust manifold means 11 by the utilization of the pulsating flow of the exhaust gases in the auxiliary exhaust manifold means 11 as hereinbefore described without the pulsating characteristic of flow of such exhaust gases being weakened.

The exhaust gases flowing in the exhaust manifold means 11 and containing the secondary air supplied thereinto through the reed valve 15 in the manner as hereinbefore described subsequently admix with the exhaust gases past the reducing catalyst unit 12 and are finally passed through the oxidizing catalyst unit 13. It is to be noted that, because of the secondary air supplied in the manner as hereinbefore described, a mixture of the exhaust gases from the engine cylinders 1, 2 and 3 and that from the engine cylinder 4 is of a nature ready to be oxidized by oxidation as it passes through the oxidizing catalyst unit 13. Therefore, the hydrocarbons and carbon monoxides contained in the exhaust gases as a whole can be-reburned to provide a substantially purified exhaust gas which is subsequently discharged to the atmosphere.

As an essential feature of the present invention, the dual-catalyst exhaust gas purifying apparatus further comprises an additional secondary air supply passage means 17 including an additional supply passage 18, having one end communicated to the downstream passage 16b and the other end communicated to any one of the exhaust ducts, for example, the exhaust duct 9c. The additional secondary air supply passage means 17 further includes a switching valve 19 which is, in the embodiment shown in FIG. 1, disposed on the additional supply passage 18 at a position substantially intermediately of the length of said passage 18. This switching valve 19 is operable to permit a portion of the secondary air, supplied into the downstream passage 16b in the manner as hereinbefore described, to flow into the exhaust duct 9c through the additional passage 18 during the opening thereof which takes place only when the oxidizing catalyst unit 13 is cool, that is, when the temperature of the oxidizing catalyst unit 13 is lower than a predetermined temperature required for the oxidizing catalyst to exhibit its performance, i.e., the oxidizing capability. For this purpose, the switching valve 19 may be employed in the form of a solenoid operated valve and is adapted to be controlled by an electric command signal fed from a detector 20. The detector 20 is to be understood as including a temperature sensor (not shown) for detecting the temperature of the oxidizing catalyst. This detection of the temperature of the oxidizing catalyst may be made by way of sensing the temperature of the oxidizing catalyst unit 13 directly, the temperature of the reducing catalyst unit 12, the temperature of the exhaust gases, or the temperature of the engine which may be represented by either the temperature of a cooling water in the engine or the temperature of a lubricating oil in the engine. In addition, instead of the employment of the detector 20, a timer circuit may be employed for generating the command signal required to open the switching valve 19 during a predetermined period of time set in the timer. Where the timer is employed instead of the detector 20, it is preferred that arrangement be made that the timer starts its operation simultaneously with the start of the engine.

With the additional secondary air supply passage means 17, when the oxidizing catalyst unit 13 is cool and the detector 20 therefore generates the command signal to open the switching valve 19, a portion of the secondary air supplied into the downstream passage 16b through the reed valve 15 by the effect of the pulsating flow of the exhaust gases in the auxiliary exhaust manifold means 11 flows into the additional supply passage 18 and then through the switching valve 19 towards the collecting duct means 9. The secondary air so introduced into the collecting duct means 9 admixes with the exhaust gases emitted from the exhaust ports of the first group G1 before said exhaust gases from the exhaust ports of the first group G1 pass through the reducing catalyst unit 12, so that the exhaust gases emitted from the exhaust ports of the first group G1 can be rendered to have a readily oxidizable nature because of the admixture of the secondary air containing oxygen. This oxidizable exhaust gases then flows through the reducing catalyst unit 12 and, as they pass therethrough, the temperature of the oxidizable exhaust gases is increased. Therefore, it is clear that the oxidizing catalyst unit 13 can readily be warmed up by the elevated temperature of the exhaust gases which have passes through the reducing catalyst unit 12.

It is to be noted that, when the catalyst unit 13 is cool and, therefore, the supply of the secondary air is effected not only into the auxiliary exhaust manifold means 11, but also into the exhaust duct 9c of the collecting duct means 9 through the passage means 17, the reducing catalyst in the catalyst unit 12 is used in the oxidizing atmosphere and, consequently, the reducing catalyst in the catalyst unit 12 will not serve to remove the nitrogen monoxide. However, so long as the catalyst unit 13 is cool, the engine is correspondingly cool and, since the amount of the nitrogen monodixe contained in the exhaust gases emitted from the engine while the latter is cool is small, no problem will arise as to the purifying capability of the apparatus of the present invention.

After the oxidizing catalyst unit 13 has been warmed up to the predetermined temperature, the detector 20 ceases generating the command signal and, therefore, the switching valve 19 becomes closed to interrupt the supply of the secondary air into the exhaust duct 9c and then into the collecting duct means 9. Since the exhaust gases emitted from the exhaust ports of the first group G1 is of a nature readily reduced in the absence of oxygen, that is, without the secondary air being mixed therewith, the reducing catalyst in the catalyst unit 12 serves to remove the nitrogen oxides. Under this condition, even though the exhaust gases after having passed through the reducing catalyst unit 12 is still of a reducing atmosphere, they will become an oxidizing atmosphere as they join together with the exhaust gases flowing into the exhaust passage 10 from the auxiliary exhaust manifold means 11. Therefore, the hydrocarbons and carbon monoxides contained in the exhaust gases as a whole can be re-burned to provide a substantially purified exhaust gas which is subsequently discharged to the atmosphere.

In practice, the temperature of the exhaust gases once elevated as they pass through the reducing catalyst unit 12 during the opening of the switching valve 19 may be slightly lowered when they adjoin together with the exhaust gases supplied into the exhaust passage 10 from the auxiliary exhaust manifold means 11. In order to avoid this, the exhaust manifold means 11 may, as best shown in FIG. 1, have a heat-insulating sheath 21 providing an adiabatic space 22 between it and the auxiliary exhaust manifold means 11.

Figure 2:
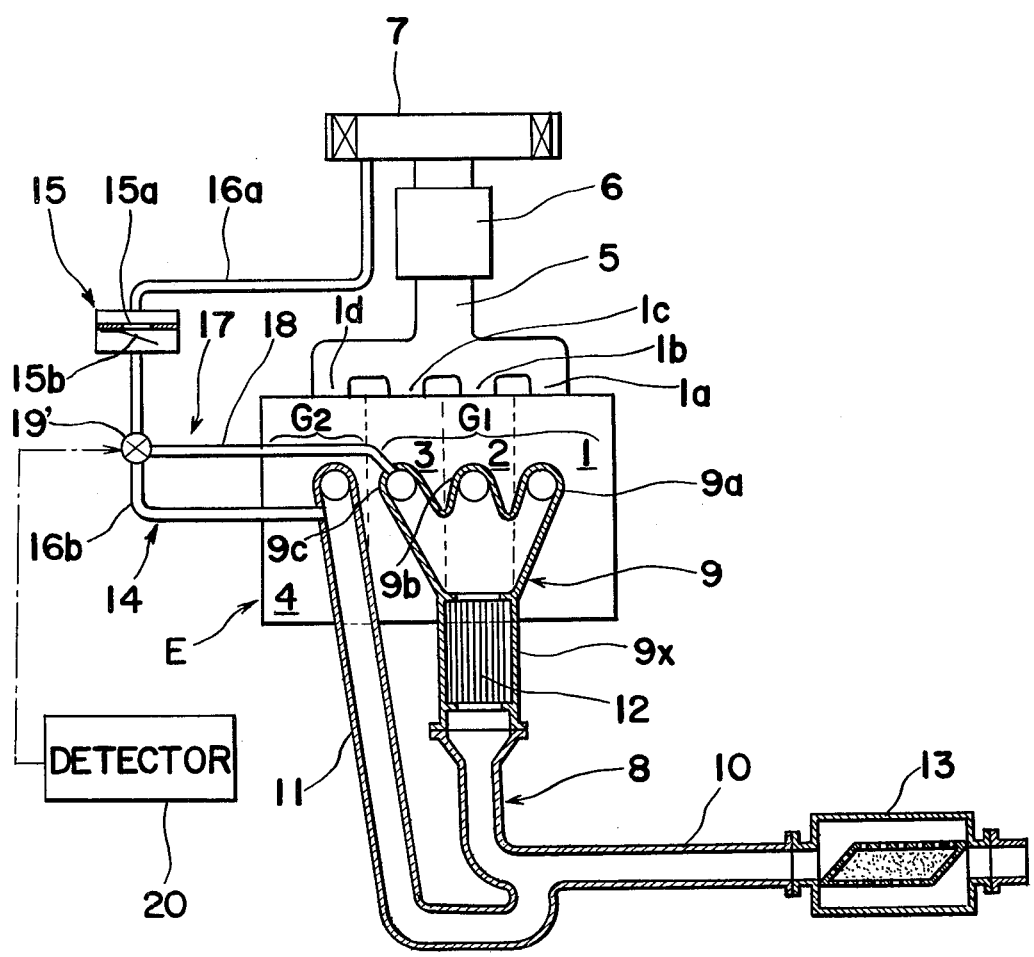
FIGS. 2 to 4 are views similar to FIG. 1, showing second, third and fourth preferred embodiments of the present invention, respectively.

It is to be noted that the switching valve 19 which has been described as disposed on the supply passage 18 in the embodiment shown in FIG. 1 may be disposed at the junction between the downstream passage 16b and the supply passage 18 such as shown by 19' in FIG. 2. The switching valve 19' employed in the embodiment of FIG. 2 is of a type which, when and so long as the command signal from the detector 20 is applied thereto, the valve 19' is in position to interrupt the supply of the secondary air towards the auxiliary exhaust manifold means 11 and to allow the whole amount of the secondary air to be supplied to the exhaust duct 9c and, when and so long as no command signal from the detector 20 is applied, the valve 19' is in position to interrupt the supply of the secondary air into the exhaust duct 9c and to allow the supply of the secondary air into the auxiliary exhaust manifold means 11.

Alternatively, the valve 19' may be of a type which effects the supply of the secondary air into both the exhaust duct 9c and the auxiliary exhaust manifold means 11 when and so long as the command signal from the detector 20 is applied thereto, but effect the supply of the secondary air only into the auxiliary exhaust manifold means 11 when and so long as no command signal from the detector 20 is applied thereto. In this case, the employment of a heat insulating sheath, similar to the heat insulating sheath 22 in the embodiment of FIG. 1, on the auxiliary exhaust manifold means 11 is recommended.

Figure 3:
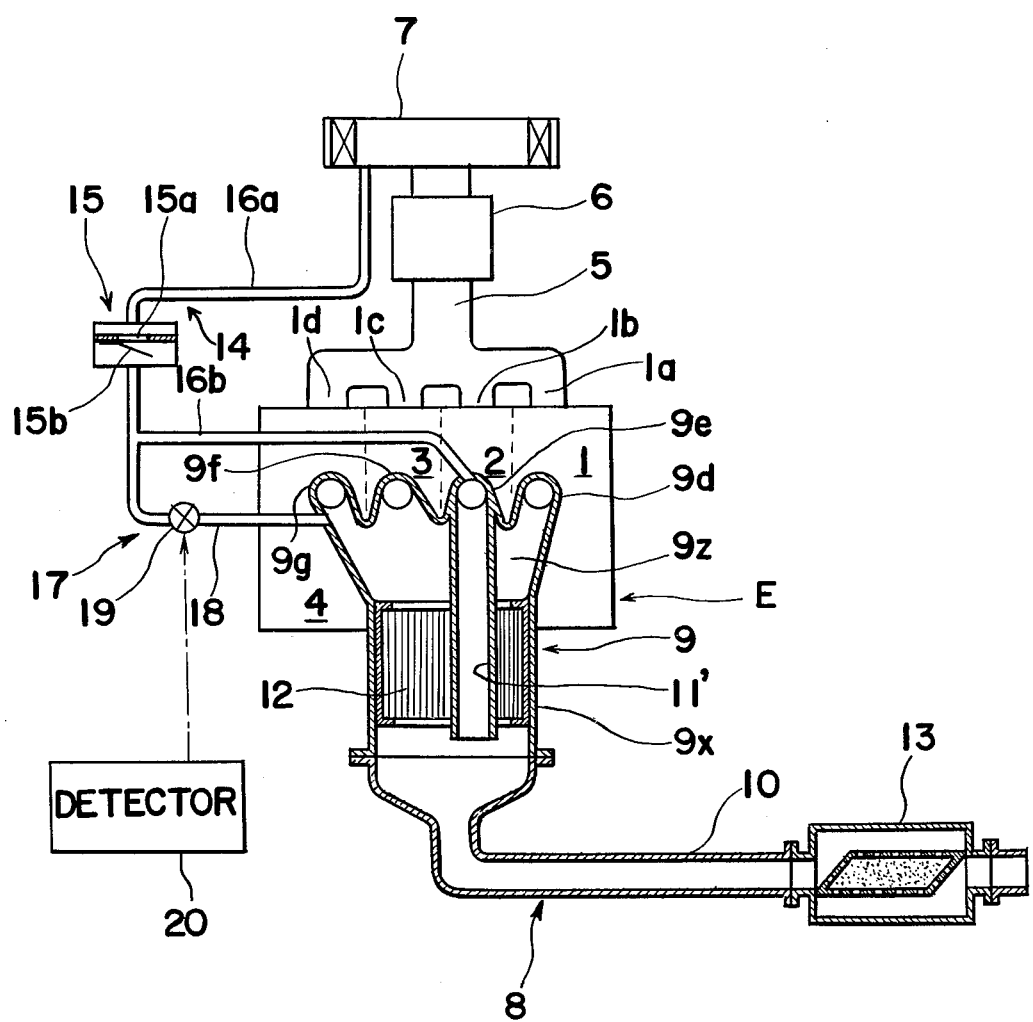

In the embodiment shown in FIG. 3, the auxiliary exhaust manifold means is shown by 11' and extends completely through the reducing catalyst unit 12 within the collecting duct means 9 so that the exhaust gases flowing through the auxiliary exhaust manifold means 11' can be warmed by the exhaust gases flowing within the collecting duct means 9 around the auxialiary exhaust manifold means 11'.

Referring now to FIG. 3, although the reference characters "G1" and "G2" used to denote the first and second groups, respectively, of the exhaust ports of the respective engine cylinders 1 to 4 are not employed in FIG. 3, it is to be understood that the exhaust ports of the engine cylinders 1, 3 and 4 form the first group G1 while the exhaust port of the engine cylinder 2 forms the second group G2. Bearing this in mind, the collecting duct means 9 has exhaust ducts 9d, 9e, 9f and 9g respectively communicated to the exhaust ports of the engine cylinders 1, 2, 3 and 4. Of these exhaust ducts, the exhaust duct 9e communicated to the exhaust port of the second group G2 is partitioned from the other exhaust ducts 9d, 9f and 9g within a common casing forming the collecting duct means 9 and is connected to the auxiliary exhaust manifold means 11'. The auxiliary exhaust manifold means 11' extends completely through the reducing catalyst unit 12 within the tubular body 9x of the collecting duct means 9 and is communicated to the exhaust passage 10 at a position downstream of the reducing catalyst unit 12 with respect to the direction of flow of the exhaust gases towards the oxidizing catalyst unit 13.

It is to be noted that, in the embodiment shown in FIG. 3, the end of the additonal supply passage 18 remote from the reed valve 15, which has been described as communicated to the exhaust ducts 9c in the foregoing embodiments, is communicated to the exhaust duct 9g.

From the foregoing, it will readily be seen that, except that in the embodiment shown in FIG. 3 the exhaust gases emitted from the exhaust port of the second group G2 into the exhaust duct 9e and then into the auxiliary exhaust manifold means 11' are warmed by the effect of the temperature of the exhaust gases emitted from the exhaust ports of the first group G1 into the exhaust ducts 9d, 9f and 9g and then into a collecting region as at 9z, the apparatus according to the embodiment shown in FIG. 3 can operate in a manner similar to that according to the embodiment shown in FIG. 1.

In any one of the foregoing embodiments shown respectively in FIGS. 1 to 3, the additional secondary air supply passage means 17 has been described as branched off from the downstream passage 16b of the secondary air supply passage means 14. However, the additional secondary air supply passage means 17 independent of the secondary air supply passage means 14 may be employed, which will now be described with reference to FIG. 4.

Figure 4:
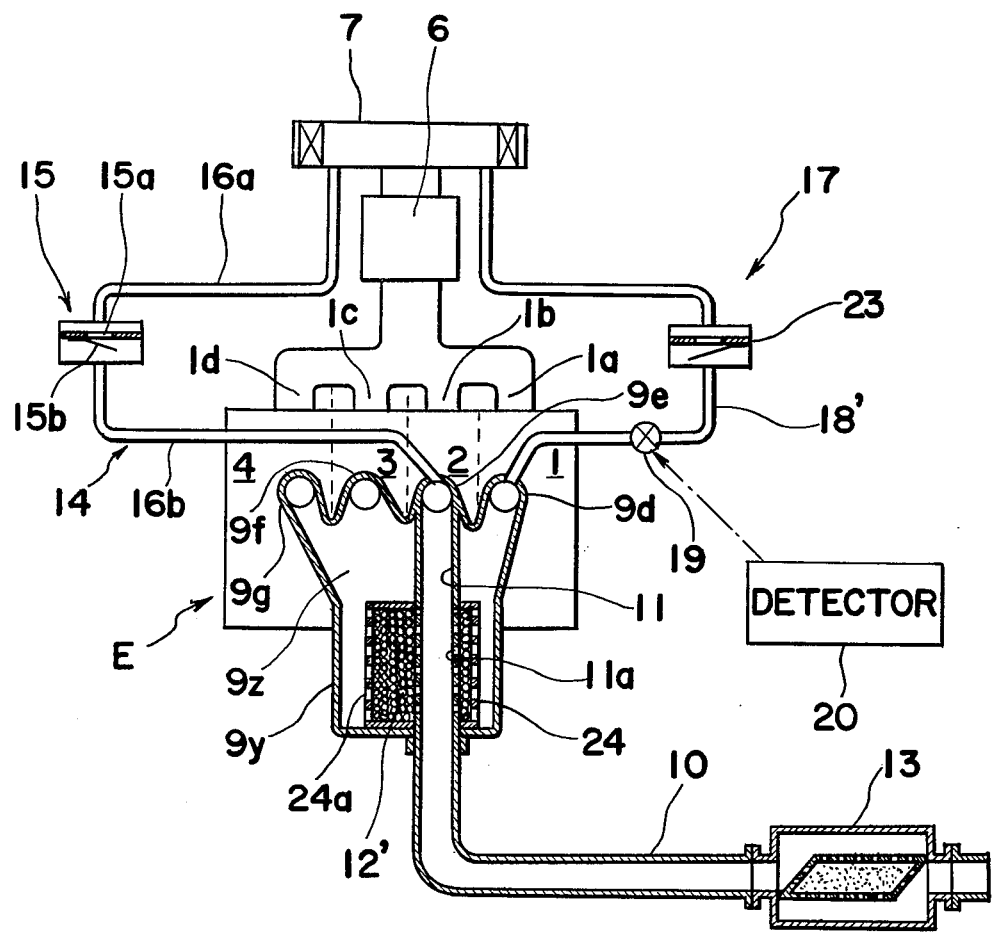

The additional secondary air supply passage means 17 shown in FIG. 4 comprises a supply passage 18' having one end communicated to a source of secondary air, i.e., the air cleaner 7, and the other end communicated to any one of the exhaust ducts which are communicated to the exhaust ports of the first group G1, for example, the exhaust duct 9d. The supply passage 18' has a check valve 23 and the switching valve 19 disposed thereon at upstream and downstream positions with respect to the direction of flow of the secondary air from the air cleaner 7 towards the exhaust duct 9d.

In the construction so far described, it is clear that, during the opening of the switching valve 19, the secondary air from the air cleaner 7 can be supplied into the exhaust duct 9d which is in turn mixed with the exhaust gases emitted from the exhaust ports of the first group G1 at the collecting region 9z.

Furthermore, irrespective of whether the additional air supply passage means 17 is employed independently of the secondary air supply passage means 14 such as shown in FIG. 4 or whether the additional secondary air supply means 17 is branched off from the secondary air supply passage means 14 such as shown in any one of FIGS. 1 to 3, where the reducing catalyst within the catalyst unit is of a pellet type, a portion of the auxiliary exhaust manifold means 11 which extends through and, therefore, is situated within the catalyst unit 12' may have a plurality of perforations 11a as shown in FIG. 4 so that the exhaust gases emitted from the first group G1 of the exhaust ports of the respective engine cylinders 1, 3 and 4 can, after having passed through interstices of catalyst pellets within the catalyst unit 12', flow into that portion of the exhaust manifold means 11 through the perforations 11a and then flow towards the oxidizing catalyst unit 13 through the exhaust passage 10 together with the exhaust gases emitted from the second group G2 of the exhaust port of the engine cylinder 2. In this case, the tubular body, as shown by 9y, should have a greater inner diameter than the outer diameter of a casing 24 forming the catalyst unit 12' on one hand and the casing 24 should have a plurality of perforations 24a for admission of the exhaust gases in the collecting region 9z into the interior of the casing 24 in which the reducing catalyst is accommodated.

In any one of the foregoing embodiments of FIGS. 3 and 4, it is clear that, during, for example, the cold start of the engine, more particularly, when the oxidizing catalyst is cool and the switching valve 19 is opened to permit the introduction of the secondary air into any one of the exhaust ducts of the collecting duct means 9 which are communicated to the exhaust ports of the first group G1, the reducing catalyst within the catalyst unit 12 or 12' is utilized under the reducing atmosphere with heat energies consequently developed by the effect of oxidization, which heat energies are used to warm the exhaust gases emitted from the exhaust port of the second group G2.

It is to be noted that, since in any one of the foregoing embodiments shown in FIGS. 1 to 4, the reducing catalyst within the catalyst unit 12 or 12' is used under the oxidizing atmosphere as hereinbefore described when and so long as the oxidizing catalyst unit 13 is cool, the temperature of the reducing catalyst unit 12 or 12' tends to elevate. Accordingly, in the case where a relatively long period of time is required for the oxidizing catalyst within the catalyst unit 13 to attain the predetermined temperature which would happen when the ambient air is very cold, the reducing catalyst unit 12 or 12' would possibily be excessively heated, for example, to a temperature above 90° C. which would results in deterioration of the reducing catalyst within the catalyst unit 12 or 12'. In order to avoid this possibility, means for cancelling the command signal from the detector 20 may be employed to close the switching valve 19 or 19' by the detection of the excessive temperature of the reducing catalyst unit 12 or 12'.

In addition, where the reducing catalyst unit 12 employs the three-way catalyst, the supply of the secondary air into any one of the exhaust ducts of the collecting duct means 9 which are communicated to the exhaust ports of the first group G1 may be continued even after the oxidizing catalyst unit 12 has been warmed up to the predetermined temperature. In this case, it is necessary to adjust the opening of the switching valve 19 so that the resultant mixture of secondary air and exhaust gases emitted from the exhaust ports of the first group G1 may have a nature substantially intermediate between the reducing atmosphere and the oxidizing atmosphere to enable the three-way catalyst to remove the carbon monoxide and hydrocarbons contained in the exhaust gases. This is advantageous in that the oxidizing catalyst unit 13 can be used for a substantially prolonged period of time. In order to achieve this, the use should be made of a detector for detecting the concentration of oxygen contained in the exhaust gases ready to enter the catalyst unit 12 and for generating an electric signal necessary to adjust the opening of the switching valve 19.

Although the present invention has fully been described in connection with the preferred embodiments thereof with reference to the accompanying drawings, it is to be noted that various changes and modifications, other than those described above, are apparent to those skilled in the art. By way of example, even after the oxidizing catalyst unit 13 has been sufficiently warmed up, the temperature of any one of the reducing catalyst unit 12 or 12' and the oxidizing catalyst unit 13 varies depending upon the engine operating condition. For example, the temperature of any one of the catalyst units 12, or 12', and 13 tends to be low during a low speed and low load operating condition of the engine E because of a relatively small capacity of the overall exhaust gases emitted and will increase with increase of the speed and the load of the engine. In order to maintain the temperature of any one of the catalyst units 12, 12', and 13 at an optimum teperature irrespective of change in engine operating condition, arrangement may be made to adjust the opening of the switching valve 19 or 19' in response to either any one of parameters representative of the engine operating condition, including the negative pressure in the intake system, the number of revolution of the engine, the vehicle speed and the opening of a throttle valve in the carburetor, and the temperature of any one of the catalyst units 12, or 12', and 13, in such a manner that, during the low speed and low load operating condition of the engine E or when the temperature of the catalyst units 12, or 12', and 13 is low, the switching valve 19 or 19' can be opened to allow the introduction of the secondary air to facilitate oxidization in the reducing catalyst unit 12 or 12' for the purpose of elevating the temperature of the reducing catalyst within the catalyst unit 12 or 12' which in turn results in warm-up of the exhaust gases emitted from the exhaust ports of the first group G1.

Accordingly, such changes and modifications are to be understood as included within the true scope of the present invention unless they depart therefrom.

We claim:

1. An exhaust gas purifying apparatus for use in an automotive vehicle engine of a type having a plurality of engine cylinders each having intake and exhaust port means communicated to a combustion chamber within the corresponding engine cylinder, and an intake manifold means having one end communicated to the intake port means of the respective engine cylinders and the other end communicated to a source of air-fuel mixture, the exhaust port means of the respective engine cylinders exhausting exhaust gases to the outside of the engine subsequent to combustion of air-fuel mixture which has been introduced from the air-fuel mixture source into the associated combustion chambers of the engine cylinders, the exhaust port means being divided into first and second groups, the number of the exhaust port means of the first group being equal to or greater than half the total number of the engine cylinders, said exhaust gas purifying apparatus comprising, in combination:

a reducing catalyst unit;
an oxidizing catalyst unit;
a first exhaust manifold means including a collecting duct means, communicated to the exhaust port means of the first group, said reducing catalyst unit being housed in position within the collecting duct means to allow the exhaust gases emitted from the exhaust port means of the first group to pass through said reducing catalyst unit, and an exhaust passage means having one end, communicated to the reducing catalyst unit, and the other end communicated to the atmosphere, said oxidizing catalyst unit being housed within the exhaust passage means and positioned downstream of the reducing catalyst unit with respect to the direction of flow of the exhaust gases from the exhaust port means of the first group towards the atmosphere;
a second exhaust manifold means having one end communicated to the exhaust port means of the second group and the other end communicated to the exhaust passage means at a position upstream of the oxidizing catalyst unit;
a first secondary air supply passage means having one end communicated to said second exhaust manifold means and the other end communicated to a source of secondary air, said first secondary air supply passage means including a first pressure operated valve disposed on said first secondary air supply passage means for supplying a secondary air by the utilization of a pulsating flow of the exhaust gases flowing through said second exhaust manifold means;
a second secondary air supply passage means having one end communicated to the collecting duct means at a position upstream of the reducing catalyst unit; and
a switching valve means operable to permit the flow of the secondary air into the collecting duct means through the second secondary air supply passage means only during a predetermined period of time in which the oxidizing catalyst unit is cool.

2. An apparatus as claimed in claim 1, wherein the number of the engine cylinders is four and the number of the exhaust port means of the first group is three.

3. An apparatus as claimed in claim 1, wherein said first secondary air supply passage means is constituted by first and second passages connected to each other by the first pressure operated valve, a free end of said first passage being communicated to the secondary air source while a free end of said second passage is communicated to the second exhaust manifold means, and wherein the other end of said second secondary air supply passage means is communicated to said second passage of said first secondary air supply passage means.

4. An apparatus as claimed in claim 1, wherein said switching valve means is disposed on said second secondary air supply passage means.

5. An apparatus as claimed in claim 3, wherein said switching valve means is disposed at the junction between said other end of said second secondary air supply passage means and said second passage of said first secondary air supply passage means.

6. An apparatus as claimed in claim 1, further comprising a heat insulating sheath mounted on the second exhaust manifold means for warming the exhaust gases flowing through said second exhaust manifold means.

7. An apparatus as claimed in claim 1, wherein said second exhaust manifold means extends completely through the reducing catalyst unit, said other end of said second exhaust manifold means terminating at a position downstream of the reducing catalyst and opening towards the exhaust passage means of the first exhaust manifold means.

8. An apparatus as claimed in claim 1, wherein said second secondary air supply passage means comprises a supply passage means having one end communicated to the secondary air source and the other end communicated to the collecting duct means at the position upstream of the reducing catalyst unit, a second pressure operated valve disposed on said supply passage means for avoiding back-flow of the exhaust gases from the collecting duct means towards the secondary air source, and wherein said switching valve means is disposed on said supply passage means at a position downstream of said second pressure operated valve with respect to the direction of flow of the secondary air from the secondary air source towards the collecting duct means.

* * * * *